United States Patent Office 3,293,222
Patented Dec. 20, 1966

3,293,222
BRANCHED CHAIN COPOLYMERS OF FORMALDEHYDE
Henri Sidi, Paramus, N.J., assignor to Tenneco Chemicals, Inc., a corporation of Delaware
No Drawing. Filed Nov. 5, 1965, Ser. No. 506,571
6 Claims. (Cl. 260—67)

This application is a continuation-in-part of my copending application Serial No. 133,783, filed August 25, 1961, now Patent No. 3,219,630, entitled "Production of Branched Chain Polyoxymethylene Polycarboxylates."

This invention relates to polyacetals and, more particularly, to high molecular weight copolymers of formaldehyde. The invention provides a new class of normally solid, high molecular weight, branched chain copolymers of formaldehyde (or its trimer, trioxane) and a comonomer, in which copolymers the terminal groups of each of the branches is acylated.

During the exhaustive investigation into the polymerization of formaldehyde (or trioxane) which preceded the filing of my copending application Serial No. 133,783, now Patent No. 3,219,630, it was found that formaldehyde (or trioxane) could be copolymerized with certain comonomers in an alkylene dicarboxylate reaction medium in which there was dissolved or suspended a catalytic amount of a formaldehyde polymerization initiator to form a partially acylated copolymer which, in turn, could be completely acylated in situ without removal from the reaction medium merely by heating the system. Further investigation revealed that the use of an alkylene dicarboxylate as the reaction medium appeared to influence the molecular configuration of the resultant copolymer by introducing branched (or pendant) chains at one or more points in the primary polymer chain, probably due to the formation of an orthocarbonate group from the alkylene dicarboxylate during the copolymerization reaction.

Structurally, the new copolymers of the invention comprise the acylated polymerization product formed by (a) contacting a formaldehyde source selected from the group consisting of monomeric formaldehyde or trioxane and at least one comonomer of the group consisting of alkylene oxides, acetals of polyhydroxy alcohols, aldehydes, or mixtures thereof, with a polymerization initiator in the presence of an alkylene dicarboxylate having a structure represented by the formula

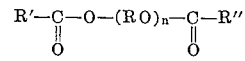

in which R is a divalent substituent selected from the group consisting of —CH$_2$— or —CH(CH$_3$)—, R' and R" each represent substituents selected from the group consisting of alkyl groups having from 1 to 18 carbon atoms, cycloalkyl groups, or aryl groups, and $n$ is an integer from 1 to 3, at a temperature in the range from about —100° C. and 80° C. under substantially anhydrous conditions, and (b) heating the polymerization product in the presence of the alkylene dicarboxylate until all of its terminal groups are substantially completely acylated. These new copolymers possess a unique combination of high temperature stability and inertness to chemicals, properties which should qualify these new thermoplastics for general use as engineering plastics.

To prepare the new branched chain copolymers of the invention, gaseous, substantially anhydrous, monomeric formaldehyde (or, alternatively, trioxane) is copolymerized with a cyclic ether (or other comonomer) by passing the comonomers into a reaction medium comprising an alkylene dicarboxylate in which there is dissolved or suspended a catalytic amount of a polymerization initiator, thereby forming a suspension of a partially acylated, high molecular weight, branched chain copolymer as an intermediate product. By merely increasing the temperature of the reaction medium, the remaining uncapped hydroxy groups of the intermediate copolymer undergo esterification to form the corresponding high molecular weight, branched chain ω-acylated copolymer.

The alkylene dicarboxylates employed in the reaction media used to produce the new branched chain copolymers of the invention are structurally characterized by the formula

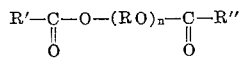

in which R is a divalent substituent selected from the group consisting of —CH$_2$— or —CH(CH$_3$)—, R' and R" each represent substituents selected from the group consisting of alkyl groups containing from 1 to 18 carbon atoms, cycloalkyl groups, or aryl groups and $n$ is an integer from 1 to 3. By way of illustration, the substituents R' and R" may include methyl, ethyl, propyl, hexyl, octyl, 2-ethylhexyl, decyl, dodecyl, hexadecyl, heptadecyl, cyclopentyl, phenyl, chlorophenyl, and hydroxyphenyl groups. Excellent results have been obtained using those alkylene dicarboxylates in the reaction medium in which R represents a methylene group (—CH$_2$—) and R' and R" each represent an alkyl group containing from 1 to 3 carbon atoms, which alkylene dicarboxylates include methylene diacetate, methylene dipropionate, methylene dibutyrate, methylene acetate propionate, the low molecular weight polymeric analogs ($n=2$ or 3) of these dicarboxylates, and mixtures thereof. Branched chain ω-acylated copolymers having excellent physical properties have been consistently produced in methylene diacetate or in mixtures of from 50 to 90 percent by weight of methylene diacetate and from 10 to 50 percent by weight of its dimer and trimer analogs.

The use of these alkylene dicarboxylates as the reaction medium in the process by which the new branched chain copolymers of the invention are prepared permits the polymerization reaction to occur under mild temperatures, at which polymerization temperatures these reaction media are liquid, inert to formaldehyde and the comonomer as well as to the polymerization-initiator, and do not dissolve the partially acylated copolymer formed; at the elevated temperatures at which the in situ stabilization is carried out, the alkylene dicarboxylates readily dissolve the high molecular weight partially acylated copolymer to form the ω-acylated branched chain copolymers of the invention. The amount of the alkylene dicarboxylate present during the polymerization is not critical but may be within the range of approximately 1 part to 1000 parts by weight of monomeric formaldehyde. In most cases, approximately 1 part to 100 parts by weight of the alkylene dicarboxylate should be employed for each part by weight of monomer.

Those comonomers which may be copolymerized with formaldehyde (or trioxane) to produce the ω-acylated comonomers of the invention are cyclic ethers which have the formula

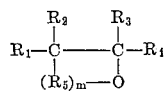

in which R$_1$, R$_2$, R$_3$ and R$_4$ each represent hydrogen, lower alkyl, or chloroalkyl group; R$_5$ represents a methylene group, an oxymethylene group, an alkyl- or haloalkyl-substituted methylene group, or an alkyl- or haloalkyl-substituted oxymethylene group; and $m$ represents a number in the range of zero to three. The preferred cyclic ethers have the formula

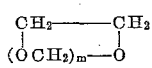

wherein $m$ is a number in the range of zero to two. Included among these cyclic ethers are ethylene oxide, 1,3-dioxolane, 1,3-propylene oxide, 1,2-propylene oxide, 1,3-butylene oxide, 1,2-butylene oxide, trimethylene oxide, tetramethylene oxide, pentamethylene oxide, 2,2-di(chloromethyl)-1,3-propylene oxide, and 1,4-dioxane. A single cyclic ether or a mixture of two or more of these ethers can be used in the preparation of the copolymers. If desired, small amounts of other compounds that will copolymerize with formaldehyde, such as aldehydes or acetals of polyhydric alcohols, may be used in place of or in combination with the cyclic ether.

Although the copolymerization reaction may be carried out in the presence or absence of a polymerization initiator, best results have been obtained by conducting the copolymerization reaction in the presence of a catalytic amount of a formaldehyde polymerization initiator, which generally is in the range from about 0.00001 to about 0.05 part by weight (and preferably from about 0.0001 to about 0.005 part by weight) per part by weight of monomeric formaldehyde. Any of the well-known formaldehyde polymerization initiators may be used in the copolymerization reaction. These include aliphatic amines, aromatic amines, hydroxypolyamines, metal organic compounds, phosphines, arsines, stilbenes, metal chelates, alkali metal and alkaline earth metal hydroxides, oxides, peroxides, boron trifluoride and its complexes, and the like. Among the preferred formaldehyde polymerization initiators are aliphatic amines, polyamines, metal chelates and metal salts, such as tri-n-butylamine, tetraalkyl-alkylene diamines, copper soaps, and metal acetylacetonates.

The copolymerization of formaldehyde to the new high molecular weight, branched chain $\omega$-acylated copolymers of the invention may be carried out in any convenient manner. For example, gaseous, substantially anhydrous, monomeric formaldehyde may be introduced into a reactor containing the alkylene dicarboxylate, the comonomer and the formaldehyde polymerization initiator. Alternatively, monomeric formaldehyde and the comonomer may be separately introduced into a reactor containing the alkylene dicarboxylate, while at the same time the initiator is added at such rate that the temperature of the reaction mixture is maintained within the desired range. Moreover, the copolymerization of formaldehyde to produce the new copolymers of the invention may be carried out as either a batchwise process or as a continuous process.

The anhydrous monomeric formaldehyde is ordinarily introduced into the reactor through a gas inlet tube opening above the surface of the alkylene dicarboxylate reaction medium so as to avoid plugging due to formation of polymer within the tube. The reaction mixture is stirred vigorously throughout the formaldehyde addition and copolymerization step. In general, the copolymerization reaction is generally carried out at a temperature between about $-100°$ C. and about $80°$ C. and, preferably, in the range between $-30°$ C. and $40°$ C. While superatmospheric and subatmospheric pressures can be employed, in most instances the reaction occurs under atmospheric pressures.

The formation of the tough, high molecular weight, branched chain, $\omega$-acylated copolymers should be carried out under non-oxidizing conditions. A convenient way of obtaining such conditions involves sweeping the reactor with a dry, inert gas, such as nitrogen, and then copolymerizing the monomeric formaldehyde and comonomer under a blanket of the inert gas. In addition, an antioxidant may be present during the copolymerization and/or may be added to the product to preclude oxidation.

Among the antioxidants that are useful for this purpose are phenothiazine, 2-mercaptobenzimidazole, diphenylamine, phenyl-$\alpha$-naphthylamine, bis-($\beta$-naphthylamino)-p-phenylene diamine, 4,4'-butylidene-bis-(3-methyl-6-tertiary butylphenol), and 5-ethyl-10,10-diphenyl-phenazasiline. When used, the amount of antioxidant generally will be in the range from about 0.01 to 1 percent by weight, based on the weight of formaldehyde introduced into the reaction medium.

To control the molecular weight and molecular weight distribution of the copolymer, it may be desirable to employ a small amount of a chain transfer agent in the reaction medium, which chain transfer agent may be added to the reaction medium before or during the copolymerization reaction. Suitable chain transfer agents include water; aliphatic alcohols (such as methanol and cyclohexanol); aliphatic acids and acid anhydrides (such as formic acid, acetic acid, butyric acid, acetic anhydride, and propionic anhydride); aromatic acids (such as benzoic acid and toluic acid); esters (such as methyl acetate, methyl propionate, ethyl formate, ethyl acetate); saturated aliphatic dicarboxylic acids and their lower alkyl esters (such as oxalic acid, diethyl oxalate, and mixtures thereof); or various mixtures of these chain transfer agents.

The copolymerization reaction occurs quite rapidly and is generally considered to be complete as soon as all of the monomeric formaldehyde has been added to the reaction medium, which may be maintained at the polymerization temperature for an additional period ranging from several minutes to an hour or more.

At the end of the copolymerization reaction, the reaction mixture comprises a suspension of a partially esterified, high molecular weight, branched chain copolymer in the alkylene dicarboxylate from which the intermediate copolymer may be isolated. Because of the uniqueness of alkylene dicarboxylates as the reaction medium, the esterification of the copolymer may be completed merely by heating the reaction mixture at a temperature in the range from about $140°$ C. to about $200°$ C. (and preferably in the range from $160°$ C. to $170°$ C.) in the presence of a small amount of an alkaline esterification catalyst, during which heating the esterified copolymer dissolves in the hot alkylene, dicarboxylate.

Many type of alkaline esterification catalysts may be used in the in situ esterification, including alkali metal salts of acids having dissociation constants, at $25°$ C., of less than $1.8 \times 10^{-4}$. These catalysts include the sodium, potassium, lithium, rubidium, and cesium salts of a wide variety of organic and inorganic acids, such as sodium formate, sodium acetate, sodium propionate, sodium laurate, sodium stearate, sodium benzoate, sodium salicylate, sodium carbonate, disodium phosphate, potassium acetate, potassium benzoate, potassium carbonate, lithium acetate, lithium salicylate, and lithium carbonate, to cite but a few. The amount of alkaline esterification catalyst which may be conveniently used is ordinarily in the range of 0.001 to 1 percent by weight, and preferably from 0.01 to 0.1 percent by weight, based on the weight of the alkylene dicarboxylate.

Optimum yields of the branched chain, $\omega$-acylated copolymers of the invention are obtained when the esterification medium also contains from about 0.1 to about 30 percent by weight of an anhydride of a saturated monocarboxylic acid, based on the weight of the alkylene dicarboxylate. These anhydrides include those of alkanoic acids having from 1 to 10 carbon atoms, cycloaliphatic acids, and aromatic acids, of which acetic acid, propionic acid, butyric acid, decanoic acid, cylohexane carboxylic acid, benzoic acid, and mixtures of these acids are representative examples. When an acid anhydride is employed to facilitate the esterification (or "capping") reaction, it should be substantially free of acid to prevent any losses in yield which may result from degradation of the polymer. If desired, small amounts of a ketene may be added periodically to react with the acid formed as a by-product of the esterification, thereby forming additional amounts of acid anhydride.

In most instances, the copolymer product recovered from the esterification reaction should be washed and dried as thoroughly as possible or otherwise treated to remove any material or by-product which might cause degradation of the polymer. For most purposes, this purification may be accomplished conveniently by washing the polymer with water or organic solvents, such as ketones, ethers, and hydrocarbons, and then drying the washed polymer. For example, the filter cake obtained by separating the polymer from the reaction medium may be washed first with acetone, then with water, and then finally with acetone.

The following examples are illustrative of the preparation of the new branched chain, ω-acylated copolymers of the invention. In each of these examples, where indicated, the thermal stability of the polymers was determined by measuring the weight loss of a one gram sample of the polymer when heated at 222° C. for one hour. All of the branched chain, ω-acylated copolymers of the invention possess a thermal degradation rate at this temperature of less than 10 percent by weight per hour.

*Example I*

Anhydrous monomeric formaldehyde was prepared by heating a suspension of 100 grams of α-polyoxymethylene in 400 ml. of mineral oil at 117°–150° C. The formaldehyde vapors from this pyrolysis were passed through a series of traps, the first of which was maintained at room temperature, the second at 0° C., and the third and fourth at —15° to —22.5 °C. The resulting purified anhydrous monomeric formaldehyde was introduced along with a stream of dry nitrogen into a reactor that contained 559 grams of methylene diacetate, 0.1 gram of 4,4'-butylidene-bis-(3-methyl-6-tert. butylphenol), and 5.0 grams of 1,3-dioxolane. The reaction mixture was maintained at 25° C. to 30° C. and stirred vigorously during the addition of the formaldehyde which took place over a period of 80 minutes. When all of the formaldehyde had been added, 0.3 ml. of boron trifluoride di-n-butyl etherate was added to the reaction mixture. The temperature of the reaction mixture rose to 40° C. and then fell slowly to room temperature. Then 0.5 gram of anhydrous sodium acetate was added, and the reaction mixture was stirred and heated gradually to 160° C., maintained at 160°–165° C. for one hour, cooled to room temperature, and filtered. The resulting esterified copolymer was washed with 500 ml. of acetone, with two 500 ml. portions of water at 25° C., with two 500 ml. portions of water at 70° C., and finally with an additional two 500 ml. portions of acetone, the second of which contained 0.1 gram of 4,4'-butylidene bis-(3-methyl-6-tert. butylphenol). After drying under a vacuum at 65° C., there was obtained 32.4 grams of an ω-acetylated formaldehyde 1,3-dioxolane copolymer. The inherent viscosity of a 0.5% solution of the copolymer in dimethylformamide which contained 1% of diphenylamine was 0.238 at 150° C. Vapor phase chromatographic analysis of its hydrolytic degradation products indicated that the acetylated copolymer contained 4.6% of combined ethylene glycol. The acetylated copolymer had excellent thermal stability as indicated by the fact that it lost no weight on being heated at 222° C. for one hour.

*Example II*

Anhydrous monomeric formaldehyde was prepared by heating a suspension of 100 grams of α-polyoxymethylene in 400 ml. of mineral oil at 117°–150° C. The formaldehyde vapors from this hydrolysis were passed through a series of traps, the first of which was maintained at room temperature, the second at 0° C., and the third and fourth at —15° C. to —22.5° C. The resulting purified anhydrous monomeric formaldehyde was introduced along with a stream of dry nitrogen into a reactor that contained 667.9 grams of methylene diacetate and 0.1 gram of 4,4'-butylidene-bis-(3-methyl-6-tert. butylphenol) at the same time that a solution of 0.3 ml. of boron trifluoride di-n-butyl etherate in 3.9 ml. of methylene diacetate and 4.2 grams of 1,3-dioxolane were being introduced into the reactor. The reaction mixture was maintained at 25° to 30° C. during the addition of the formaldehyde, boron trifluoride di-n-butyl etherate solution, and 1,3-dioxolane, which was accomplished in 60 minutes. After the addition of 0.5 gram of anhydrous sodium acetate and 2.4 ml. of n-tributylamine, the reaction mixture was stirred and heated gradually to 160° C., maintained at 160°–165° C. for one hour, cooled to room temperature, and filtered. The resulting acetylated copolymer was washed and dried by the procedure described in Example I, yielding 39.4 grams of an ω-acetylated formaldehyde 1,3-dioxolane copolymer which had an inherent viscosity of 0.33 as measured under the conditions set forth in Example I and which contained 1.45% of combined ethylene glycol and 0.45% of combined diethylene glycol. The thermal degradation rate of the acetylated copolymer at 222° C. was 0.68% per hour.

*Example III*

Anhydrous monomeric formaldehyde was prepared by heating a suspension of 100 grams of α-polyoxymethylene in 400 ml. of mineral oil at 117°–150° C. The formaldehyde vapors from this pyrolysis were passed through a series of traps, the first of which was maintained at room temperature, the second at 0° C., and the third and fourth at —15° to —25° C. The resulting purified anhydrous monomeric formaldehyde was introduced along with a stream of dry nitrogen into a reactor that contained 400.3 grams of methylene diacetate, 0.1 gram of 4,4'-butylidene-bis-(3-methyl-6-tert. butylphenol), and 5.0 grams of 1,3-dioxolane. At the same time a solution containing 0.6 ml. of boron trifluoride diethyl etherate in 3.9 ml. of methylene diacetate was added gradually to the reaction mixture. The reaction mixture was maintained at 25° to 30° C. during the addition of the formaldehyde and boron trifluoride diethyl etherate solution. After the addition of 0.5 gram of anhydrous sodium acetate and 2.4 ml. of n-tributylamine, the reaction mixture was stirred and heated gradually to 160° C., maintained at 160°–165° C. for one hour, cooled to room temperature, and filtered. The resulting acetylated copolymer was washed and dried by the procedure described in Example I. There was obtained 39.7 grams of an ω-acetylated formaldehyde 1,3-dioxolane copolymer which had an inherent viscosity of 0.228 as measured under the conditions set forth in Example I and which contained 3.1% of combined ethylene glycol, 0.1% of combined diethylene glycol, and 0.3% of combined glycerol. The acetylated copolymer had excellent thermal stability as indicated by the fact that it lost no weight on being heated at 222° C. for one hour.

*Example IV*

Anhydrous monomeric formaldehyde was prepared by heating a suspension of 100 grams of α-polyoxymethlene in 400 ml. of mineral oil at 112°–150° C. The formaldehyde vapors from this pyrolysis were passed through a series of traps, the first of which was maintained at room temperature, the second at 0° C., and the third and fourth at —25° to —28° C. The resulting purified anhydrous monomeric formaldehyde was introduced along with a stream of dry nitrogen into a reactor that contained 500 ml. of cyclohexane, 0.1 gram of 4,4'-butylidene-bis-(3-methyl-6-tert. butylphenol), 0.3 ml. of boron trifluoride di-n-butyl etherate, and 5 ml. of 1,3-dioxolane. The reaction mixture was maintained at 17° to 30° C. and stirred vigorously during the addition of the formaldehyde which took place over a period of 60 minutes. The reaction mixture was filtered, and the solid copolymer that was obtained was added to 500 ml. of methylene diacetate to which 0.5 gram of anhydrous sodium acetate had been added. The resulting mixture was stirred and gradually heated to 160°–170° C., maintained at this temperature for one hour, cooled to room temperature, and filtered. The acetylated copolymer was washed and dried by the procedure described in Example I, yielding 54 grams of an ω-acetylated formaldehyde 1,3-dioxolane copolymer which had an inherent viscosity of 0.222 as measured under the conditions set forth in Example I. Vapor phase chromatographic analysis of its hydrolytic degradation products showed that the copolymer contained 0.9% of combined ethylene glycol, 0.2% of combined glycerol, and 0.02% of combined diethylene glycol. The thermal degradation rate of the acetylated copolymer at 222° C. was 3.2% per hour.

*Example V*

Anhydrous monomeric formaldehyde was prepared by heating a suspension of 100 grams of α-polyoxymethylene in 400 ml. of mineral oil at 115°–150° C. The formaldehyde vapors from this pyrolysis were passed through a series of traps, the first of which was maintained at room temperature, the second at 0° C., and the third and fourth at −25° C. to −29° C. The resulting purified anhydrous monomeric formaldehyde was introduced along with a stream of dry nitrogen into a reactor that contained 444 grams of toluene, 0.1 gram of 4,4′-butylidene-bis-(3-methyl-6-tert. butylphenol), 0.3 ml. of boron trifluoride di-n-butyl etherate, and 5 ml. of 1,3-dioxolane. The reaction mixture was maintained at 25° to 30° C. and stirred vigorously during the addition of formaldehyde which took place over a period of 70 minutes. The precipitated copolymer was then isolated, washed with 200 ml. of toluene, and dried under vacuum at 65° C. There was obtained 62.5 grams of dried copolymer.

The copolymer was added to 560 grams of methylene diacetate to which 0.5 gram of anhydrous sodium acetate had been added. The reaction mixture was stirred and gradually heated to 160° C. while a slow stream of dry nitrogen was introduced into it. The reaction mixture was heated at 160°–165° C. for one hour, cooled to room temperature, and filtered. The resulting acetylated copolymer was washed and dried by the procedure described in Example I. There was obtained 54 grams of an ω-acetylated formaldehyde 1,3-dioxolane copolymer which had an inherent viscosity of 0.660 as measured under the conditions set forth in Example I and which contained 3.13% of combined ethylene glycol. The thermal degradation rate of the acetylated copolymer at 222° C. was 4.3% per hour.

*Example VI*

A mixture of 560 grams of methylene diacetate and 0.1 gram of phenothiazine was heated in a reactor to distill off 120 grams of methylene diacetate and then cooled to −25° C. To this mixture was added first 3.0 grams of ethylene oxide and 0.1 gram of tri-n-butylamine and then anhydrous monomeric formaldehyde obtained by heating at 120°–150° C. a suspension of 100 grams of α-polyoxymethylene in 300 grams of mineral oil and passing the resulting vapors through the series of traps described in Example I. The addition of formaldehyde took place over a period of one hour during which time the reaction mixture was maintained at a temperature between −20° C. and −25° C. After the addition of 0.4 gram of anhydrous sodium benzoate, the reaction mixture was heated at 160°–170° C. for 1 hour, cooled to room temperature, and filtered. The resulting acetylated copolymer was washed and dried by the procedure described in Example I. The product, which weighed 48.6 grams, had a thermal degradation rate at 222° C. of 7.15% per hour, and an inherent viscosity of 0.922 as measured under the conditions of Example I.

I claim:
1. A normally solid, high molecular weight, branched chain copolymer comprising the acylated polymerization product formed by (a) contacting a formaldehyde source selected from the group consisting of monomeric formaldehyde and trioxane and at least one cyclic ether having a structure represented by the formula

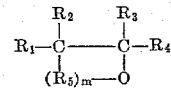

in which $R_1$, $R_2$, $R_3$ and $R_4$ each represents a substituent selected from the group consisting of hydrogen, lower alkyl, and chloro-substituted lower alkyl, $R_5$ represents a divalent substituent selected from the group consisting of methylene, oxymethylene, alkyl- and haloalkyl-substituted methylene, and alkyl- and haloalkyl-substituted oxymethylene, and $m$ represents a number from zero to three, with a polymerization initiator in the presence of an alkylene dicarboxylate having a structure represented by the formula

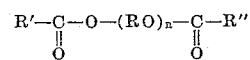

in which R is a divalent substituent selected from the group consisting of —$CH_2$— and —$CH(CH_3)$—, $R'$ and $R''$ each represent substituents selected from the group consisting of alkyl groups having from 1 to 18 carbon atoms, cycloalkyl groups, and aryl groups, and $n$ is an integer from 1 to 3, at a temperature in the range from about −100° C. and 80° C. under substantially anhydrous conditions, and (b) heating the polymerization product in the presence of the alkylene dicarboxylate until all of its terminal groups are substantially completely acylated.

2. A normally solid, high molecular weight, branched chain copolymer according to claim 1, in which the acylated polymerization product is initially formed by reacting the formaldehyde source with an alkylene oxide as the cyclic ether so that the polymerization product contains from 0.1 to 20 mole percent of randomly recurring groups derived from the comonomer.

3. A normally solid, high molecular weight, branched chain copolymer according to claim 1, in which the acylated polymerization product is initially formed by reacting the formaldehyde source with an acetal of a polyhydroxy alcohol as the cyclic ether so that the polymerization product contains from 0.1 to 20 mole percent of randomly recurring groups derived from the comonomer.

4. A normally solid, high molecular weight, branched chain copolymer according to claim 1, in which the acylated polymerization product is initially formed by reacting the formaldehyde source with an aldehyde as the cyclic ether so that the polymerization product contains from 0.1 to 20 mole percent of randomly recurring groups derived from the comonomer.

5. A normally solid, high molecular weight, branched chain, ω-acylated copolymer having from 99.9 to 80 mole percent of randomly recurring oxymethylene groups, and from 0.1 mole percent of randomly recurring groups derived from a cyclic ether having a structure represented by the formula

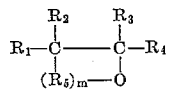

in which $R_1$, $R_2$, $R_3$ and $R_4$ each represents a substituent selected from the group consisting of hydrogen, lower alkyl, and chloro-substituted lower alkyl; $R_5$ represents a divalent substituent selected from the group consisting of methylene, oxymethylene, alkyl- and haloalkyl-substituted methylene, and alkyl- and haloalkyl-substituted oxymethylene; and $m$ represents a number from zero to three.

6. A normally solid, high molecular weight, branched chain copolymer according to claim 5, in which all of the terminal groups are substantially completely acetylated.

References Cited by the Examiner

Staudinger et al.: Helvetica Chimica Acta, vol 8, pp. 41–70 (1925).

SAMUEL H. BLECH, *Primary Examiner.*

WILLIAM H. SHORT, *Examiner.*

L. M. MILLER, *Assistant Examiner.*